United States Patent [19]

Sarabi et al.

[11] Patent Number: 5,407,994

[45] Date of Patent: Apr. 18, 1995

[54] THERMOPLASTIC POLYALKYLENETEREPHTHALATE MOULDING COMPOUNDS

[75] Inventors: Bahman Sarabi; Karsten-Josef Idel, both of Krefeld; Klaus Reinking, Wermelskirchen; Klaus Zander, Mülheim; Klaus Kraft, Krefeld, all of Germany

[73] Assignee: Bayer Aktiengesellschaft, Leverkusen, Germany

[21] Appl. No.: 198,766

[22] Filed: Feb. 18, 1994

[30] Foreign Application Priority Data

Feb. 26, 1993 [DE] Germany .................. 43 05 947.3

[51] Int. Cl.$^6$ ............................................. C08L 67/02
[52] U.S. Cl. ........................... 524/539; 525/438; 525/440
[58] Field of Search ........... 525/438, 440; 524/539

[56] References Cited

U.S. PATENT DOCUMENTS

| | | | |
|---|---|---|---|
| 4,141,882 | 2/1979 | Kodama | 525/438 |
| 4,529,779 | 7/1985 | Arai | 525/438 |
| 4,904,746 | 2/1990 | Brown | 525/438 |
| 4,999,388 | 3/1991 | Okamoto | 525/438 |

FOREIGN PATENT DOCUMENTS

| | | |
|---|---|---|
| 523933 | 1/1993 | European Pat. Off. |
| 2007511 | 1/1970 | France |
| 2213312 | 8/1974 | France |
| 54615 | 12/1967 | Luxembourg |
| WO93/04125 | 3/1993 | WIPO |

OTHER PUBLICATIONS

Acta Polymerica 31 (1980), pp. 108–110.

*Primary Examiner*—Patricia A. Short
*Attorney, Agent, or Firm*—Connolly & Hutz

[57] ABSTRACT

Thermoplastic polyalkyleneterephthalate moulding compounds prepared by blending
  A) 99.9 to 80.0% by weight of one or more thermoplastic polyalkyleneterephthalates and
  B) 0.1 to 20.0% by weight of an epoxy/isocyanurate resin in the melt.

7 Claims, No Drawings

THERMOPLASTIC POLYALKYLENETEREPHTHALATE MOULDING COMPOUNDS

The object of the invention is thermoplastic polyalkyleneterephthalate moulding compounds with improved toughness and an increased melt viscosity.

Thermoplastic polyester moulding compounds, e.g. polybutyleneterephthalate (PBT) or polyethyleneterephthalate (PET) are characterised by a set of advantageous properties such as high rigidity, high resistance to solvents and good processability when being injection moulded. In addition, thermoplastic polyalkyleneterephthalate moulding compounds possess a high heat resistance, particularly when they are reinforced with glass fibres and/or fillers. This type of polyester moulding compound is therefore often used in the electrical and motor vehicle industries.

A disadvantage of these polyester moulding compounds is, however, their often unsatisfactory toughness, which restricts their use for moulded articles which are subject to impact stress, especially thin-walled moulded items. This disadvantage becomes more pronounced the lower the viscosity of the polymer, i.e. the lower its molecular weight.

Therefore processes have been developed which enable the viscosity of the primary low-viscosity polyester produced during production to be increased. One such process is solid phase post-condensation, in which the polyester granules are stored for a long time under nitrogen at about 200° C. (see Acta Polym. 31 (1980) 108). This process is not only expensive, but requires the maintenance of a specific ratio of terminal groups (OH/COOH) for reproducible process control.

Thus, there is an interest in increasing the viscosity of polyester moulding compounds without having to accept the disadvantages associated with solid phase post-condensation.

It has now been found that polyester moulding compounds which are obtained by mixing polyalkyleneterephthalate with epoxy/isocyanurate resins (EPIC resins) in the molten state have an improved viscosity and improved mechanical properties. The polyester moulding compounds obtained in this way have considerably higher impact strengths, elongations at break and melt viscosities than the polyesters which are used.

The object of the invention is therefore thermoplastic polyester moulding compounds prepared by blending A) 99.9 to 80.0% by weight, preferably 99.9 to 85, in particular 99.5 to 90% by weight, of thermoplastic polyalkyleneterephathalate with B) 0.1 to 20.0% by weight, preferably 0.1 to 15, in particular 0.5 to 10% by weight of epoxy/isocyanurate resin in the melt.

Polyalkyleneterephthalates in the sense of the present invention are reaction products of aromatic dicarboxylic acid or their reactive derivatives (e.g. dimethyl esters or anhydrides) and aliphatic, cycloaliphatic or araliphatic diols or mixtures of these diols. Preferred polyalkyleneterephthalates can be prepared from terephthalic acid (or its reactive derivatives) and aliphatic or cycloaliphatic diols with 2 to 10 carbon atoms using known methods (Kunststoff-Handbuch, Vol. VIII, p. 695 et seq., Karl-Hauser-Verlag, Munich 1973).

Preferred polyalkyleneterephthalates contain at least 80, preferably 90 mol-%, with reference to the dicarboxylic acid component, of terephthalic acid groups and at least 80, preferably at least 90 mol-%, with reference to the diol component, of ethylene glycol and/or butanediol-1,4 groups.

The preferred polyalkyleneterephthalates may contain, apart from esters of terephthalic acid groups, up to 20 mol-% of groups from other aromatic dicarboxylic acids with 4 to 12 carbon atoms, such as groups from phthalic acid, isophthalic acid, naphthalene-2,6-dicarboxylic acid, 4,4'-diphenyl-dicarboxylic acid, succinic, adipic, sebacic, acelaic or cyclohexanediacetic acid. The preferred polyalkyleneterephthalates may contain, apart from ethylene glycol or butanediol-1,4 groups, up to 20 mol-% of other aliphatic diols with 3 to 12 carbon atoms or cycloaliphatic diols with 6 to 21 carbon atoms, e.g. groups from propanediol-1,3, 2-ethylpropanediol-1,3, neopentyl glycol, pentanediol-1,5, hexanediol-1,6, cyclohexanedimethanol-1,4, 3-methylpentane-diol-2,4, 2-methylpentanediol-2,4, 2,2,4-trimethylpentanediol-1,3, and -1,5; 2-ethylhexanediol-1,3 and - 1,6; 2,2-diethylpropanediol-1,3, hexanediol-2,5, 1,3,-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane (DE-OS 24 07 674, 24 07 776, 27 15 932).

Particularly preferred polyalkyleneterephthalates are those which have been prepared from terephthalic acid and its reactive derivatives (e.g. its dialkyl esters) alone and ethylene glycol and/or butanediol-1,4 (polyethylene and polybutyleneterephthalate) and mixtures of these polyalkyleneterephthalates.

Preferred polyalkyleneterephthalates are also copolyesters which are prepared from at least two of the acid components mentioned above and/or at least two of the alcohol components mentioned above. Particularly preferred copolyesters are poly-(ethyleneglycol/-butane-diol-1,4)terephthalates.

The polyalkyleneterephthalates used as component A generally possess an intrinsic viscosity of ca. 0.4 to 1.5 dl/g, preferably 0.5 to 1.3 dl/g, measured in phenol/o-dichlorobenzene (1:1 parts by weight) at 25° C. The polyalkyleneterephthalates may be used alone or as a mixture.

Epoxy/isocyanurate resins (EPIC resins) are prepared from polyfunctional 1,2-epoxides and polyisocyanates (see DE-OS 3 323 193, EP-A 0 130 454, DE-OS 3 323 084, DE-OS 3 323 123) and are cross-linkable, i.e. they form three-dimensional spatial structures in the presence of catalysts and/or at elevated temperature, these being neither fusible nor soluble.

The polyfunctional 1,2-epoxides are any aliphatic, cycloaliphatic, aromatic or heterocyclic compounds which have at least two epoxide groups, i.e. 1,2-epoxide groups. The polyepoxides which are preferred as suitable for component B) have 2 to 4, preferably 2, epoxide groups per molecule and an epoxide equivalent weight of 90 to 500, preferably 170 to 220.

Suitable polyepoxides are, for example, polyglycidyl ethers of polyhydric phenols, for example of catechol, resorcinol, hydroquinone, 4,4'-dihydroxydiphenylmethane, 4,4'-dihydroxydiphenylcyclohexane, 4,4'-dihydroxy-3,3'-dimethyldiphenylpropane, 4,4'-dihydroxydiphenyl, 4-hydroxyphenyl-4-hydroxybenzoate, 1,1-bis-(4-hydroxyphenyl)-3,3,5-trimethylcyclohexane, 4,4'-dihydroxydiphenylsulphone, tris-(4-hydroxyphenyl)-methane, of the chlorination and bromination products of the previously mentioned diphenyls, of Novo-lacquers (i.e. the reaction products of mono- or polyhydric phenols with aldehydes, especially formaldehyde, in the presence of acid catalysts), of diphenols, which have been obtained by esterification of 2 moles of the sodium salt of an aromatic oxycarboxylic acid with one mole of a dihalogenoalkane or dihalogenoalkyl ether (e.g. GB-A 1 017 612) or of polyphenols which have been obtained by the condensation of phenols and long-chain halogenoparaffins which contain at least two halogen atoms (e.g. GB-A 1 024 288). The following may also be mentioned: polyepoxide compounds based on aromatic amines and epichlorhydrin, e.g. N-di-(2,3-epoxypropyl)-aniline, N,N'-dimethyl-N,N'-diepoxypropyl-4,4'-diaminodiphenylmethane, N-diepoxypropyl-4-aminophenylglycidylether (e.g. GB-A 772 830 and 816 923), glycidyl esters of polybasic, aromatic, aliphatic and cycloaliphatic carboxylic acids, for example diglycidyl phthalate, diglycidyl adipate and glycidyl esters of reaction products from 1 mole of an aromatic or cycloaliphatic dicarboxylic anhydride and ½ mole of a diol or 1/n moles of a polyol with n hydroxy groups or diglycidyl hexahydrophthalate, which may optionally be substituted with methyl groups.

Glycidyl ethers of polyhydric alcohols, for example of 1,4-butanediol, 1,4-butenediol, glycerine, trimethylolpropane, pentaerythritol and polyethyleneglycols may also be used. Of further interest are triglycidyl isocyanurate, N,N'-diepoxypropyloxamide, polyglycidylthio-ethers from polymercaptoic thiols, such as for example, bismercaptomethylbenzene, diglycidylmethylenetrisulphone and polyglycidyl ethers based on hydantoins.

Furthermore, epoxidation products from polyunsaturated compounds may be mentioned, such as vegetable oils and their transformation products, epoxidation products of di- and polyolefins, such as butadiene, vinylcyclohexene, 1,5-cyclooctadiene, 1,5,9-cyclododecatriene and polymers and mixed polymers which still contain double bonds which may be epoxidised, e.g. these based on polybutadiene, polyisoprene, butadiene/styrene mixed polymers, divinylbenzene, dicyclopentadiene, unsaturated polyesters, other epoxidation products from olefins which are accessible by Dieis-Alder addition and then converted into polyepoxides by epoxidation with per-compounds or from compounds which contain two cyclopentene or cyclohexene rings linked together via bridging atoms or groups of bridging atoms. In addition, polymers of unsaturated monoepoxides may be mentioned, for example made from glycidyl methacrylate or allylglycidyl ether.

Preferably, the following polyepoxide compounds or a mixture thereof are used, according to the invention, for component B):

Polyglycidyl ethers of polyhydric phenols, in particular of bisphenol A; polyepoxide compounds based on aromatic amines, in particular bis-(N-epoxypropyl)-aniline, N,N'-dimethyl-N,N'-diepoxypropyl-4,4'-diaminodiphenylmethane and N-diepoxypropyl-4-aminophenyl-glycidyl ether; polyglycidyl esters of cycloaliphatic dicarboxylic acids, in particular diglycidyl hexahydrophthalate and polyepoxides of the reaction product of n moles of hexahydrophthalic anhydride and 1 mole of a polyol with n hydroxyl groups (n=an integer from 2 to 6), in particular 3 moles of hexahydrophthalic anhydride and one mole of 1,1,1-trimethylolpropane and 3,4-epoxycyclohexylmethane-3,4-epoxycyclohexane-carboxylate.

Liquid polyepoxides or low viscosity diepoxides, such as bis-(N-epoxypropyl)-aniline or vinylcyclohexenediepoxide may, in special cases, further lower the viscosity of already liquid polyepoxides or convert solid polyepoxides into liquid mixtures.

The polyisocyanates used as starting components for preparing the cross-linkable EPIC resins are any organic polyisocyanates of the type known per se from polyurethane chemistry. The following are suitable, for example, aliphatic, cycloaliphatic, araliphatic, aromatic and heterocyclic polyisocyanates, such as are described e.g. by W. Siefkin in Justus Liebig's Analen der Chemie, 562, pages to 136, for example those of the formula (I)

Q(NCO)$_n$       I in which n represents the number 2, 3 or 4, preferably 2 and

Q represents an aliphatic hydrocarbon group with 2 to 18, preferably 6 to 10, carbon atoms, a cycloaliphatic hydrocarbon group with 4 to 15, preferably 5 to 10, carbon atoms, an aromatic hydrocarbon group with 6 to 15, preferably 6 to 13, carbon atoms or an araliphatic hydrocarbon group with 8 to 15, preferably 8 to 13, carbon atoms, wherein the cycloaliphatic, aromatic or araliphatic hydrocarbon group may be substituted by alkyl groups, preferably $C_1$–$C_4$ alkyl groups, in particular methyl.

Examples which may be mentioned are diisocyanates such as ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3 and -1,4 diisocyanate and any mixture of these isomers, 1-isocyanato-3,3,3-trimethyl-5-isocyanato-methylcyclohexane (DE-A 1 202 785, U.S. Pat. No. 3,401,190), 2,4- and 2,6-hexahydrotoluylene diisocyanate and any mixture of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and any mixture of these isomers, diphenylmethane-2,4'- and/or -4,4'-diisocyanate, naphthylene-1,5 diisocyanate, etc.;

triisocyanates such as triphenylmethane-4,4', 4" triisocyanate, polyphenyl-polyethylene polyisocyanates which are obtained by aniline/formaldehyde condensation and subsequent phosgenation (GB 874 430 and GB 848 671), m- and p-isocyanatophenylsulphonyl isocyanates (U.S. Pat. No. 3,454,606), perchlorinated arylpolyisocyanates (U.S. Pat. No. 3,277,138), polyisocyanates with carbodiimido groups (U.S. Pat. No. 3,152,162), norbornane diisocyanates (U.S. Pat. No. 2,492,330), polyisocyanates with allophanate groups (GB 994 890), polyisocyanates with isocyanurate groups (U.S. Pat. No. 3,001,973), polyisocyanates with acylated urea groups (DE-A 1 230 778), polyisocyanates with biuret groups (U.S. Pat. Nos. 3,124,605 and 3,201,372), polyisocyanates prepared by telomerisation reactions (U.S. Pat. No. 3,654,106), polyisocyanates with ester groups (U.S. Pat. No. 3,567,763), reaction products of the abovementioned isocyanates with acetals (DE-A 1 072 385) and polyisocyanates containing polymeric fatty esters (U.S. Pat. No. 3,445,883) and polyisocyanates with urethane groups (DE-A 1 230 778), etc.

It is also possible to use distillation residues which contain isocyanate groups and which are produced during the industrial production of isocyanates, optionally dissolved in one or more of the previously mentioned polyisocyanates. Furthermore, it is possible to use any mixtures of the previously mentioned polyisocyanates.

Readily available industrial polyisocyanates are preferred, e.g. 2,4- and 2,6-toluylene diisocyanate and any mixture of these isomers ("TDI"), in particular polyphenyl-polymethylene polyisocyanates, such as are produced by aniline/formaldehyde condensation and subsequent phosgenation ("crude MDI") and polyisocyanates which contain carbodiimide groups, urethane groups, allophanate groups, isocyanurate groups, urea groups or biuret groups ("modified polyisocyanates"), in particular polyisocyanates which are derived from 2,4- and/or 2,6-toluylene diisocyanate or from 4,4'- and/or 2,4'-diphenylmethane diisocyanate.

Particularly preferred is the use of an isomeric and/or homologous mixture of polyisocyanates from the diphenylmethane series with a 2,4'-diisocyanatodiphenylmethane content of more than 20% by weight.

This is a matter of polyisocyanate mixtures from the diphenylmethane series with a 2,4'-diisocyanatodiphenylmethane content of more then 20% by weight, preferably of 30 to 70% by weight. Apart from these 2,4'-isomers, the particularly preferred polyisocyanate component generally contains other isomeric or homologous polyisocyanates from the diphenylmethane series. This means that the particularly preferred polyisocyanate component is in general either a mixture of 2,4'-diisocyanatodiphenylmethane and 4,4'-diisocyanatodiphenylmethane and optionally 0 to 20% by weight, with reference to the total mixture, of 2,2'-diisocyanatodiphenylmethane, or else a mixture of these isomers and polynuclear polyphenyl-polymethylene polyisocyanates. There is generally a 10 to 60% by weight content, with reference to the total mixture, of this type of polynuclear polyisocyanate in the last mentioned mixtures. The first mentioned diisocyanate mixture enriched with 2,4'-isomers suitable for use as a polyisocyanate component can be obtained, for example, by distilling a diisocyanate mixture of the given composition out of a polyisocyanate mixture, such as is produced by phosgenation of aniline/formaldehyde condensates. The likewise specially preferred suitable mixture containing polynuclear polyisocyanates can be obtained, for example, by back-mixing the last mentioned distillation product with a 4,4'-diisocyanatodiphenylmethane-depleted phosgenation product, for example in accordance with DE-A 1 923 214. It is also possible directly to obtain this type of mixture, i.e. a polyisocyanate mixture whose content of 2,4'-diisocyanatodiphenyl-methane corresponds to the given data, by appropriate control of the aniline/formaldehyde condensation process. U.S. Pat. No. 3,277,173 describes, for example, a route to polyamine mixtures in the diphenylmethane series with a high 2,4'-diaminodiphenylmethane content. The particularly preferred polyisocyanate for use may be obtained directly by phosgenation of this condensate which is rich in 2,4'-diaminophenylmethane. Routes to this type of polyisocyanate mixture are also given in DE-A 1 937 685 and in U.S. Pat. No. 3,362,979. The amount of 2,4'-diisocyanatophenylmethane is also above 20% by weight, with reference to the total mixture, in particularly preferred suitable polyisocyanate mixtures which contain polynuclear polyisocyanates of the diphenylmethane series.

To prepare EPIC resins, the polyfunctional 1,2-epoxides and the polyisocyanates are used in a ratio by weight which corresponds to a ratio by equivalents of isocyanate groups to epoxide groups of 1.2:1 to 500:1, preferably 3:1 to 65:1 and in particular 5:1 to 30:1.

The object of the present invention is also a process for the preparation of the abovementioned polyester moulding compounds, wherein the polyester component is mixed with the epoxy/cyanurate resin in the molten state.

Generally, the components are mixed at temperatures between 220° and 300° C., in particular between 240° and 280° C.

To prepare the moulding compounds according to, the invention, the usual mixing units such as single and twin screw extruders or screw rolling mills, e.g. bus co-kneaders, are suitable.

Incorporation of EPIC resins takes place in such a way that the molten EPIC resin is metered into the polyester melt in the extruder. However, it is also possible to mix polyester granules or powder with molten or solid EPIC resin in a mixing unit and then to melt the polyester granules.

To prepare the polyester moulding compounds according to the invention, the following may be mixed into the thermoplastic polyester in the molten state:

A mixture of polyfunctional 1,2-epoxides and polyisocyanates which may optionally contain a cross-linking catalyst (EPIC resin in the A state) and/or reactive pre-polymers which cross-link when heated, made from polyfunctional 1,2-epoxides and polyisocyanates which may optionally contain a cross-linking catalyst (EPIC resin in the B state).

Of the various states for the EPIC resin, it has been shown that the B state is the most favorable for the preparation of the moulding compounds according to the invention. The preparation of reactive EPIC resin in the B state takes place, e.g. as in EP-A 0 272 563, by reacting a) at least one organic polyisocyanate with b) at least one organic compound which contains at least 2 epoxide groups, in an amount which corresponds to a ratio by equivalents of isocyanate groups to epoxide groups of 1.2:1 to 500:1, characterised in that the mixture containing components a) and b) is reacted in the presence of c) a tertiary amine as catalyst to give an intermediate product which contains oxazolidinone and isocyanurate groups and the reaction is terminated at a conversion of a maximum of 65% of the isocyanate groups present in the starting mixture by the addition of an amount of d) an alkylating alkyl sulphonate which is at least equivalent to the amount of amine.

Component a) is any organic polyisocyanate, such as those which have been described above. Component b) is a polyfunctional 1,2-epoxide, such as those which are described above.

Catalyst component c) is any mono- or polyfunctional organic amine with tertiary amino groups. Suitable amines of the type mentioned have, in general, a molecular weight of 59 to 353, preferably 101 to 185. Preferably, they are those tertiary amines which are liquid at the reaction temperature of the first reaction stage. Typical examples of suitable or preferred suitable amines are triethylamine, tri-n-butylamine, N,N,N',N'-tetramethylethylenediamine, N,N-dimethylbenzylamine, triethylenediamine or dimethyloctylamine, N- methylmorpholine and bis-(N,N-dimethylaminoethyl)-ether.

Catalysts c) are used in amounts of 0.01 to 2, preferably 0.01 to 0.1% by weight, with reference to the total weight of components a) and b).

Chain terminators d) are catalyst poisons for catalysts c). Suitable ones are any alkylating esters of organic sulphonic acids. Preferably these alkyl sulphonates have a molecular weight of 110 to 250. Suitable are, for example, both aliphatic alkyl sulphonates such as methyl n-butanesulphonate, methyl n-perfluorobutanesulphonate or ethyl n-hexanesulphonate and also aromatic alkyl sulphonates such as methyl, ethyl or butyl benzenesulphonate, methyl, ethyl or n-butyl p-toluenesulphonate, methyl 1-naphthalenesulphonate, methyl 3-nitrobenzenesulphonate or methyl 2-naphthalenesulphonate.

The aromatic sulphonates mentioned are preferred. Particularly preferably, methyl p-toluenesulphonate is used as component d). Likewise, methyl iodide and dimethyl sulphate are also suitable as component d).

Component d) is used in at least an amount such that it is equivalent to the tertiary amine nitrogen atoms in component c).

Moulded articles or profiles may be produced from the thermoplastic polyesters according to the invention by injection moulding or extruding under the processing conditions which are customary for thermoplastic polyesters.

The usual additives may be added to the mixtures according to the invention. The following may be mentioned by way of example: fibrous reinforcing substances, glass beads, mineral or metallic fillers, pigments, de-moulding agents, flow-improving agents, nucleating agents and stabilisers, which may be incorporated in the mixtures according to the invention singly or in appropriate combinations.

The most important fibrous reinforcing material for polyurethane and epoxide film formers and epoxide or aminosilane adhesion promotors is coated glass fibres with diameters of 1 to 20 .m, preferably 5 to 13 .m. In addition, carbon fibres, aramide fibres and fibrous single crystals, so-called whiskers of e.g. K titanate or Si carbide, may also be used as fibrous reinforcing materials to reinforce mixtures according to the invention. The concentrations of fibrous reinforcing materials in mixtures according to the invention are 5 to 60% by weight, preferably 20 to 50% by weight, with reference to 100% by weight of A) and B).

Mineral fillers which may be mentioned are kaolin, wollastonite, mica, talc, amorphous quartz, crystalline quartz, metal oxides and sulphides, e.g. $TiO_2$, ZnO, ZnS, carbonates such as e.g. $MgCO_3$, $CaCO_3$ or sulphates such as e.g. $CaSO_4$, $BaSO_4$ etc. or iron, aluminium, copper etc. may be used as metallic fillers. Furthermore, coloring carbon black and conductivity carbon black and/or graphite may be used as fillers.

These fillers may be incorporated in mixtures according to the invention in concentrations of 10 to 80% by weight, preferably 20 to 60% by weight [with reference to 100% by weight of A) and B)].

It is also advantageous to incorporate into these, combinations of 10 to 60% by weight of fibrous reinforcing materials and 60 to 10% by weight of mineral fillers to reinforce mixtures according to the invention [each with reference to 100% by weight of A) and B)].

Incorporation of the auxiliary substances into the polyester moulding compounds according to the invention may take place in the usual mixing units, e.g. single or twin screw extruders. However, it is also possible to mix the auxiliary substances into the polyester at the same time as the EPIC resin.

The thermoplastic moulding compounds according to the invention are used to prepare moulded items. They may also contain additional coloring agents such as pigments, processing auxiliary substances, e.g. lubricants and demoulding agents, stabilisers, fireproofing additives, etc.

Components used

Polyalkyleneterephthalate

Polybutyleneterephthalate (PBT) with a melt viscosity of 140 Pa.s (measured at T=260° C./1000 $s^{-1}$), or an intrinsic viscosity of 0.905 to 0.945 dl/g (measured in phenol/o-dichlorobenzene 1:1 at 25° C.).

EPIC resin

Preparation of a prepolymer (EPIC resin in the B state) which is capable of cross-linking when warm.

80 parts by wt. of 4,4'-diisocyanato-diphenylmethane (NCO content 33.6%) are mixed at 50° C. with 20 parts by wt. of the diglycidyl ether of bisphenol A (epoxide number 0.585) and 0.5 ml (3.2 mmol) of dimethylbenzylamine and then heated to 120° C. The slightly exothermic reaction indicates the immediate start of oxazolidinone and isocyanurate formation. After 15 minutes reaction without external heating, the mixture is cooled to 90° C. Then the reaction is terminated by the addition of 6.5 ml of a chain-breaker solution (15.4% by wt. strength solution of methyl p-toluenesulphonate in 4,4'-diisocyanato-diphenylmethane). The mixture is then poured onto a teflon sheet, where it solidifies to give a resin which softens at ca. 40° C. and is solid and non-tacky at room temperature; NCO content: 13.8%.

EXAMPLES

Example 1

98 parts by wt. of PBT and 2 parts by wt. of EPIC resin are extruded in a ZSK 32 twin screw extruder made by Werner and Pfleiderer, at 260° C. and with a screw speed of 150 rpm and the molten mixture is made into granules with round sections. Test rods (80×10×4 $mm^3$) and dumbbell specimens (no. 3 according to DIN 53455) were injection moulded from these granules at 260° C. melt temperature and 80° C. mould temperature. Tensile tests according to DIN 53455 and flexural impact tests according to ISO 180 method 1 C were performed using these samples.

Comparison example 1

Test rods with the dimensions 80×10×4 $mm^3$ and dumbbell specimens no. 3 according to DIN 53455 were injection moulded from a PBT with a melt viscosity of 140 Pa.s (measured at T=260° C./100 $s^{-1}$), at 260° C. melt temperature and 80° C. mould temperature. Tensile tests according to ISO IR S27, DIN 53455 and flexural impact tests according to ISO 180 method 1 C were performed using these samples.

TABLE 1

| Property | Test condition | PBT (Comparison) | PBT + 2% EPIC (Ex. 1) |
|---|---|---|---|
| Viscosity(Pa · s) | 260° C./1000 $s^{-1}$ | 140 | 230 |
| Elongation at break(%) | 50 mm/min | 20 | 94 |
| E modulus (N/$mm^2$) | 1 mm/min | 2500 | 2800 |
| Impact resistance | 23° C. | 100 | * |

TABLE 1-continued

| Property | Test condition | PBT (Comparison) | PBT + 2% EPIC (Ex. 1) |
|---|---|---|---|
| (kJ/m$^2$) | −30° C. | 65 | 150 |

* = did not break

The comparison shows that the mixture according to the invention is far superior to the starting polyester with regard to elongation at break and impact resistance in the cold.

Example 2

The same as example 1 but with an additional 30% of glass fibres (GF).

TABLE 2

|  | Test condition | Comparison example 2 | Example 2 |
|---|---|---|---|
| PBT | — | 70 | 70 |
| GF (%) | — | 30 | 30 |
| EPIC (%) | — | — | 2 |
| Impact resistance (kJ/m$^2$) | 23° C. | 48 | 60 |
| Viscosity (Pa · s) | 260° C./1000s$^{-1}$ | 200 | 260 |

Example 3

96 parts by wt. of polyethyleneterephthalate (PET) and 4 parts by wt. of EPIC resin are extruded in a ZSK 32 twin screw extruder made by Werner and Pfleiderer, at 290° C. and with a screw speed of 150 rpm, and the molten mixture is made into granules with round sections. The melt viscosity of these granules was measured at 280° C. and compared with that of PET (Table 3).

TABLE 3

|  |  | Comparison | Example 3 |
|---|---|---|---|
| PET | % | 100 | 96 |
| EPIC resin | % | — | 4 |
| Viscosity (Pa · s) | 280° C./1000 s$^{-1}$ | 150 | 250 |

We claim:

1. Thermoplastic polyalkyleneterephthalate molding compounds prepared by blending:

A) 99.9 to 80.0% by weight of thermoplastic polyalkyleneterephthalates; and

B) 0.1 to 20.0% by weight of an epoxy/cyanurate resin prepared by reacting a polyglycidylether of a polyhydric phenol with a polyisocyanate, the polyisocyanate having the formula (I)

$$Q(NCO)_n \qquad (I)$$

in which n represents the number 2, 3 or 4, and

Q represents an aliphatic hydrocarbon group with 2 to 18 carbon atoms, a cycloaliphatic hydrocarbon group with 4 to 15 carbon atoms, an aromatic hydrocarbon group with 6 to 15 carbon atoms or an araliphatic hydrocarbon group with 8 to 15 carbon atoms, wherein the cycloaliphatic, aromatic or araliphatic hydrocarbon group may be substituted by alkyl groups.

2. Thermoplastic polyalkyleneterephthalate moulding compounds according to claim 1, with 99.9 to 75% by weight of component A) and 0.1 to 15% by weight of component B).

3. Thermoplastic polyalkyleneterephthalate moulding compounds according to claim 1, wherein component A) is polybutyleneterephthalate, polyethyleneterephthalate or a mixture thereof.

4. Thermoplastic polyalkyleneterephthalate moulding compounds according to claim 1, wherein the moulding compounds contain 5 to 60% by weight of reinforcing material and 10 to 80% by weight of filler, each being with reference to 100% by weight of A) and B), as well as other additives selected from the group consisting of processing auxiliary substances, colorants and fireproofing agents.

5. The molding compound of claim 1, wherein the polyhydric phenol is selected from the group consisting of catechol, resorcinol, hydroquinone, 4,4'-dihydroxyphenylmethane, 4,4'-dihydroxydiphenylcyclohexane, 4,4'-dihydroxy-3,3'-dimethyldiphenylpropane, 4,4'-dihydroxydiphenyl, 4-hydroxyphenyl-4-hydroxybenzoate, 1,1-bis-(4-hydroxyphenyl)-3,3,5-trimethylcyclohexane, 4,4'-dihydroxydiphenylsulfone, and tris-(4-hydroxyphenyl)-methane.

6. The molding compound of claim 1 containing 99.5 to 90% by weight A) and 0.5 to 10% by weight B).

7. Moulded articles, prepared from moulding compounds according to claim 1.

* * * * *